United States Patent Office 2,982,369
FRONT-AXLE ASSEMBLY FOR TRACTORS
AND THE LIKE Werner Hausmann, Uthleben, near Nordhausen, Germany, assignor to VEB Schlepperwerk Nordhausen, Nordhausen, Harz, Germany, a corporation of Germany Filed Oct. 13, 1958, Ser. No. 766,747

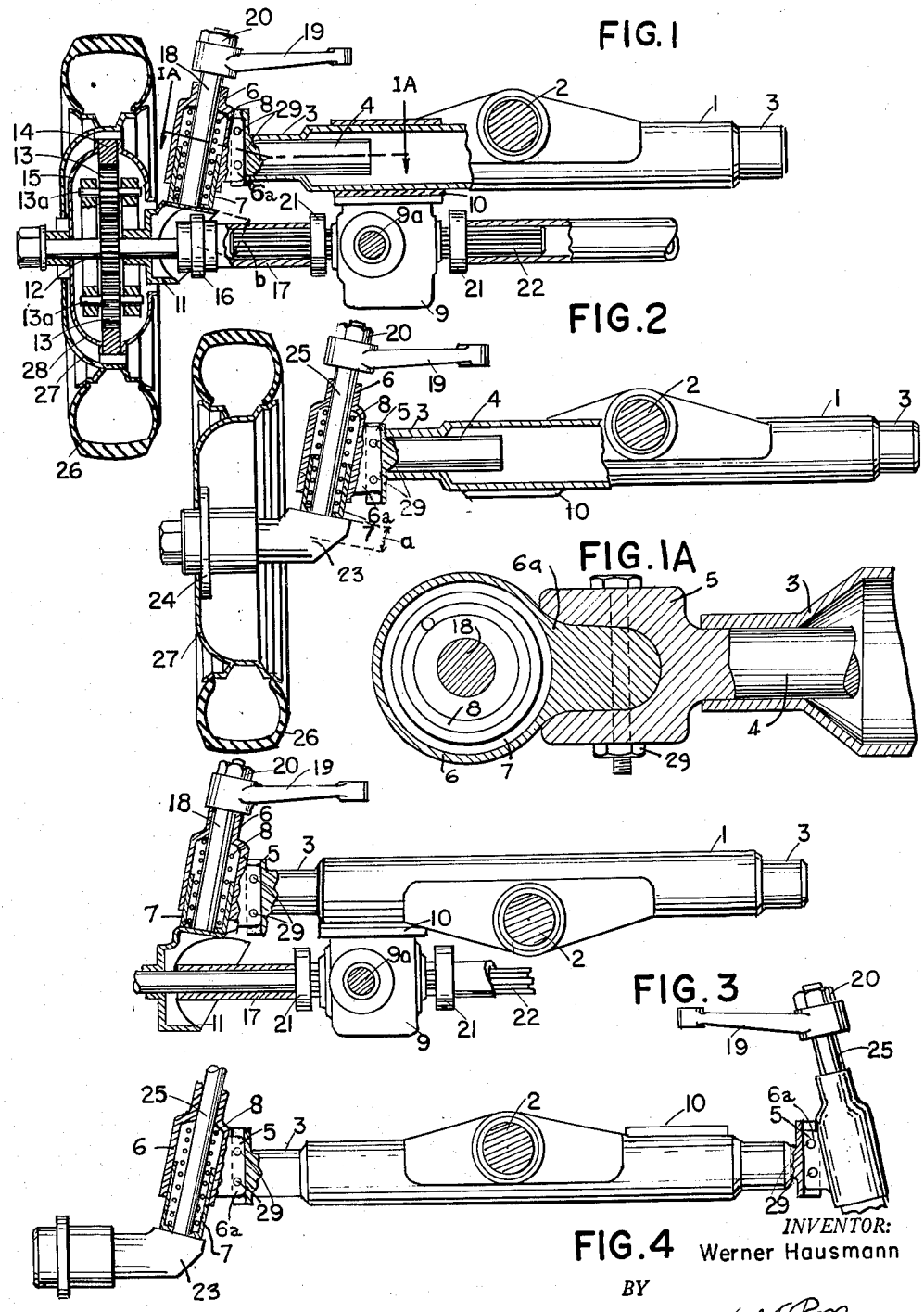

Claims priority, application Germany Mar. 12, 1958

4 Claims. (Cl. 180—42)

This invention relates in general to front-axle assemblies for vehicles, and more particularly to an improved front-axle assembly for agricultural tractors.

Conventional tractor front-axle assemblies do not allow themselves to be changed from a driven axle to a non-driven axle without exchanging one entire axle assembly for another. Since a driven front axle usually only adds about ten to twenty percent to the traction power of a tractor, the conventional complete interchange of axles along with their associated parts is economically unjustified because considerable labor is required for such a complete interchange and the cost of storing such a large number of parts is also very high. Furthermore, existing tractor front-axle assemblies usually allow the front-wheel gauge to be adjusted only by removing, reversing, and resecuring the front wheels which have their wheel disks offset to one side to effect this purpose.

An object of this invention is to provide a front-axle assembly for agricultural tractors which may be more easily changed from a driven to a non-driven front axle by merely exchanging some of the auxiliary components while the main parts of the assembly remain the same.

A further object of this invention is to provide a front-axle assembly which allows a continuous, telescoping wheel-gauge adjustment while the steering kinematics of the axle assembly remain unchanged.

Another object of this invention is to provide a front-axle assembly which not only allows a front axle to be changed from the non-driven to the driven type, but also adjusts the height of the front axle from the ground to compensate for the difference in height of a non-driven and a driven axle and wheel assembly.

A feature of the invention resides in the provision of a central front-axle support terminating in a pair of housings, hereinafter termed axle fists, each adapted to receive from below a steering knuckle extending upwardly from a wheel mount, the underside of the support being further provided with a base adapted for the removable attachment thereto of a differential-gear box operatively connectable with each front wheel through a horizontal shaft traversing the mount. Upon the removal of the differential and the shaft assembly driven thereby, the wheel mount may be replaced by a simplified hub supporting the freely spinning wheel. As it will generally be impractical to maintain the same effective distance between wheel axis and axle fist when substituting one type of mounting for the other, the invention according to another of its features provides means for selectively raising and lowering the axle fists with respect to the forward part of the chassis from which they are suspended.

In order to enable a convenient adjustment of the wheel gauge, the connection between each axle fist and its central support, as well as that between each wheel hub and its differential driving means, advantageously consists of telescoped elements.

Additional objects, advantages, and features of the invention will be apparent from the following description and the accompanying drawing wherein:

Fig. 1 is a rear view of a representative part of a front-axle assembly of the driven type, embodying the invention, with parts broken away in section to show details of construction;

Fig. 1A is an enlarged cross-sectional view taken along line IA—IA of Fig. 1;

Fig. 2 is a similar view of the same front-axle assembly changed from the driven to the non-driven type; and Figs. 3 and 4 are fragmentary rear views of a modified front-axle assembly according to the invention, adapted for driven and non-driven operation respectively.

Fig. 1 shows a tubular front-axle center piece 1 which is centrally suspended from the chassis of the tractor by a longitudinally extending supporting pin 2. The ends of the center piece form clamping sleeves 3 each adapted to receive a preferably tubular horizontal rod 4 which may be adjustably locked in position by suitable fastening means not shown. Each rod 4 terminates in a bracket 5 of U-shaped horizontal cross section. An axle fist 6 is attached to the rod 4 by means of an integral radial flange 6a which extends between the two legs of the U-shaped bracket 5 and is secured to it by bolts 29.

Extending upward within the axle fist 6 is an axially freely displaceable sliding sleeve 7 which encloses and guide a helical compression spring 8. The compression spring 8 tends to force the sleeve 7 downwards from the axle fist 6 to provide a resilient mounting for each front wheel. The center piece 1 has fixed to its lower surface a base 10 to which may be secured, by bolting or other conventional means, a differential-gear box 9.

When a driven axle is desired, the steering knuckle 18 of a wheel mount 11 needs only to be inserted upwardly into the sleeve 7 so as to extend above the axle fist 6. The steering lever 19 of the tractor then is fixed to the top of the knuckle 18 by means of the nut 20. The wheel mount 11 carries a self-contained unit 28 which is a reduction-gear assembly to enable the tractor motor to drive the front wheels at the same low gear ratio as the back wheels. Attached to this reduction-gear unit 28 by way of a universal joint 16 is a splined sleeve 17. The reduction-gear unit 28 consists of a driving pinion 12 which turns a large ring gear 14 by means of intermediate gears 13 which are rotatably mounted upon axles 13a secured to a bracket connected to the mount 11. This entire reduction-gear unit 28 is mounted within the enclosing wheel-hub barrel 15.

The differential-gear box 9 is removably secured in position from the base 10. A power-takeoff shaft 9a extends rearwardly from the gear box 9 to connect with the tractor motor not shown. At both sides of the gear box 9 there is driven a universal joint 21 which ends in a splined shaft butt 22 fitting within the splined sleeve 17. Thus torque from the differential-gear box 9 is transmitted to each self-contained reduction-gear unit 28 and thus to the front wheels. Each front wheel consists of a conventional tire 26 mounted on the laterally offset wheel disk 27.

Fig. 2 shows a non-driven front axle assembled from the same main units. In this case a steering knuckle 25 is inserted into the axle fist 6 in the same manner as has been described for the knuckle 18. The same steering arm 19 is then connected to it by means of the nut 20. The kunckle 25, however, terminates in an elbow 23 formed at its lower end to carry the freely rotating hub 24. The wheel disk 27, having the tire 26 mounted upon it, is then secured to the hub 24. Thus, except for the actual driving mechanism and the few replaced parts, all the elements of the front-axle assembly remain the same.

It should be noted at this point that, owing to the need for accommodating the wheel mount 11 above the joint 16 in the positively driven system of Fig. 1, the distance *a* between the lower end of sleeve 7 and the wheel axis in Fig. 2 is less than the corresponding distance *b* in Fig. 1. A compensation may be made for this difference by rotating the rod 4 of each wheel through 180° within its clamping sleeve 3. Since the U-shaped bracket 5 is eccentrically secured to the rod 4, this rotation raises or lowers the bolts 29 and thus raises or lowers the position in which the axle fist 6 is secured. In this manner an adjustment may be made so that the height of the front of the tractor above the ground remains the same upon a switching from a driven to a non-driven front axle or vice versa. This is very important as the height of the rear axle does not vary so that, without such adjustment, the tractor would nose up or down when changed from one type of front axle to the other.

The wheel-gauge adjustment can easily be made whether the axle assembly is of the driven or the non-driven type. Thus, in either case it is only necessary to loosen the clamping sleeves 3 and to reset the rods 4 therein. With the assembly of Fig. 1, the splined sleeve 17 slides outward about the splined shaft butt 22 as the rod 4 is moved outward or inward to increase or to decrease the front-wheel gauge. This construction is particularly satisfactory as the wheel-gauge adjustment does not affect the transmission of torque to the front wheels or alter the steering kinematics of the front-axle assembly.

For fixed-gauge tractors and other vehicles the system may be modified as illustrated in Figs. 3 and 4. In this case, the brackets 5 can be fixedly secured (as by welding) to the ends of the central member 1. Figs. 3 and 4 also illustrate how the required level adjustment may be realized by bodily inverting the entire axle support 1, 5 on its fulcrum 2 instead of merely reversing the positions of the brackets. It will be noted that, with this arrangement, the brackets 5 must have a certain eccentricity, equaling one-half the level difference to be compensated, with respect to the pin 2 and not necessarily to the member 1, as in the preceding embodiment.

The position of base 10 on the underside of member 1 is not critical and may be selected at the location most suitable for connection to the transmission shaft 9a.

It will be apparent that this invention is not limited to the embodiments specifically described and that many changes, additions, and modifications can be made in connection therewith without departing from the spirit and scope of the invention except as it may be more particularly limited in the appended claims.

What is claimed is:

1. In a vehicle, in combination, an elongated axle support, mounting means securing said support in a generally horizontal position to the chassis of the vehicle, a housing with a substantially vertical bore mounted at each extremity of said support, a base secured to the underside of said support intermediate its ends, differential-gear means removably suspended from said base, drive means operatively connected with said differential-gear means, a wheel mount adjacent each extremity of said support, said wheel mount being provided with an upstanding knuckle detachably received in said bore, shaft means detachably extending from said differential-gear means to said wheel mount for imparting motion to a wheel carried thereon, and steering means operatively coupled with said knuckle, the extremities of said support being rotatable through 180° about a horizontal axis and being provided with connecting means offset from said axis for selectively supporting said housings at either of two different levels with respect to said chassis while maintaining said bore substantially vertical.

2. The combination according to claim 1 wherein said support has a body terminating at each end in a hollow sleeve, each of said extremities being provided with a rod rotatably fitting inside said sleeve and adapted to be clamped thereto in two positions 180° apart.

3. The combination according to claim 1 wherein said mounting means includes a centrally positioned pivot pin, said support being swingable about said pin into two horizontal positions 180° apart.

4. In a vehicle, in combination, an elongated axle support, mounting means securing said support in a generally horizontal position to the chassis of the vehicle, a housing with a substantially vertical bore mounted at each extremity of said support, a base secured to the underside of said support intermediate its ends, differential-gear means removably suspended from said base, drive means operatively connected with said differential-gear means, a wheel mount adjacent each extremity of said support, said wheel mount being provided with an upstanding knuckle detachably received in said bore, shaft means detachably extending from said differential-gear means to said wheel mount for imparting motion to a wheel carried thereon, and steering means operatively coupled with said knuckle, at least the extremities of said support being eccentrically rotatable about a horizontal axis for selectively supporting said housings at either of two different levels with respect to said chassis while maintaining said bore substantially vertical, each of said extremities comprising a U-shaped bracket, said housing being provided with a flange received between the legs of the U formed by said bracket.

References Cited in the file of this patent

UNITED STATES PATENTS

| 606,311 | Sydenham et al. | June 28, 1898 |
| 1,793,482 | Hendrickson | Feb. 24, 1931 |
| 2,750,199 | Hart | June 12, 1956 |

FOREIGN PATENTS

| 80,916 | Austria | July 10, 1920 |
| 933,999 | France | Jan. 7, 1948 |
| 291,251 | Great Britain | May 31, 1928 |